(12) United States Patent
Villalon et al.

(10) Patent No.: US 10,843,385 B2
(45) Date of Patent: Nov. 24, 2020

(54) METHOD FOR PROVIDING A MOULDING COMPOSITION AND MOULDING COMPOSITION

(71) Applicant: HEXCEL COMPOSITES SAS, Montluel (FR)

(72) Inventors: Esteban Villalon, Montluel (FR); Jimmy Grondin, Montluel (FR)

(73) Assignee: HEXCEL COMPOSITES SAS, Dagneux (FR)

( * ) Notice: Subject to any disclaimer, the term of this patent is extended or adjusted under 35 U.S.C. 154(b) by 270 days.

(21) Appl. No.: 16/063,984

(22) PCT Filed: Dec. 22, 2016

(86) PCT No.: PCT/EP2016/082441
§ 371 (c)(1),
(2) Date: Jun. 19, 2018

(87) PCT Pub. No.: WO2017/109107
PCT Pub. Date: Jun. 29, 2017

(65) Prior Publication Data
US 2019/0001531 A1    Jan. 3, 2019

(30) Foreign Application Priority Data

Dec. 24, 2015 (EP) .................................. 15202664
Dec. 24, 2015 (EP) .................................. 15202668

(51) Int. Cl.
*B29B 11/16* (2006.01)
*B29B 13/02* (2006.01)
(Continued)

(52) U.S. Cl.
CPC ............ *B29B 13/023* (2013.01); *B29B 11/16* (2013.01); *B29B 13/00* (2013.01); *B29B 13/08* (2013.01); *C08J 5/24* (2013.01)

(58) Field of Classification Search
None
See application file for complete search history.

(56) References Cited

U.S. PATENT DOCUMENTS

| 7,537,827 B1 | 5/2009 | Lehmann et al. |
| 2013/0303042 A1 | 11/2013 | Schmidt et al. |

(Continued)

FOREIGN PATENT DOCUMENTS

| WO | 2010/108701 A1 | 9/2010 |
| WO | 2012/093006 A1 | 7/2012 |
| WO | 2012/130672 A1 | 10/2012 |

OTHER PUBLICATIONS

Akiko Yoshioka et al.; "Solvent Effect on the Glass Transition Temperature of Syndiotactic Polystyrene Viewed from Time-Resolved Measurements of Infrared Spectra at the Various Temperatures and Its Simulation by Molecular Dynamics Calculation", Macromolecules, vol. 37, No. 2, Jan. 1, 2004, pp. 467-472, XP055348133, US.

(Continued)

*Primary Examiner* — Jacob T Minskey
(74) *Attorney, Agent, or Firm* — W. Mark Bielawski (57) ABSTRACT

Treating an uncured resin matrix composition to impart energy to the resin matrix composition enables a stable Tg to be achieved whereby the resin matrix composition may be stored and has a low tack enabling subsequent processing and handling. The invention provides a method of achieving a stable Tg without the resin matrix composition starting to cure and a method of determining the treatment regime by which a resin matrix composition with a stable Tg may be obtained. The resin matrix composition may be fresh or reused uncured resin matrix composition and may contain fibrous reinforcement.

6 Claims, 5 Drawing Sheets

(51) Int. Cl.
*B29B 13/08* (2006.01)
*B29B 13/00* (2006.01)
*C08J 5/24* (2006.01)

(56) References Cited

U.S. PATENT DOCUMENTS

2014/0087613 A1\* 3/2014 Spyrou .............. C08G 18/3206
442/59
2015/0151454 A1 6/2015 Herrmann et al.
2015/0306790 A1 10/2015 Spyrou et al.

OTHER PUBLICATIONS

"What is B-Stage? and How do they do it?", Dec. 27, 2011, XP055348793, URL:http://www.thinkcomposites11c.com/barcelona/What is B-stage. pdf.

\* cited by examiner

METHOD FOR PROVIDING A MOULDING COMPOSITION AND MOULDING COMPOSITION

This invention relates to a moulding composition and to a method of making a moulding composition using a treated prepreg and/or a treated resin matrix composition. In particular, the prepreg is treated to provide a stabilised uncured resin matrix composition with fibrous reinforcement and is impregnated with a further resin matrix composition to produce a moulding composition. The prepreg is suitably treated under a regime which is determined by testing the prepreg to ascertain conditions for stabilising the glass transition temperature (Tg) of the uncured prepreg.

The term prepreg or semipreg is used herein to describe a moulding material or structure in which the fibrous reinforcement material has been impregnated with a liquid resin matrix composition to the desired degree and the liquid resin matrix composition is substantially uncured or partially cured. "Uncured" in this context means that the resin matrix composition is below a cure level of 95% of its total reaction enthalpy required to fully cure the resin matrix composition, and that the resin matrix composition is therefore still curable to a level which is at least 95% of the total reaction enthalpy.

Curable thermosetting resin matrices or resin matrix compositions are employed in a range of applications including in composites which comprise fibrous reinforcement materials impregnated with the cured resin matrix and in so-called "prepregs" which comprise fibrous reinforcement materials impregnated with the uncured resin matrix composition which may then be processed to form a reinforced composite material. Curable thermosetting resin matrix composition. Such composite materials are typically lightweight and of high strength and are used in many structural applications such as in the automobile and aerospace industries and in industrial applications such as wind turbine components such as spars and the shells used to make the blades. Such applications typically require the prepreg and composite to comply with stringent requirements, often stipulated by the manufacturer of products for such applications, as regards handling, processing and storage of the materials especially where safety considerations are paramount Such applications typically require the prepreg and composite to comply with stringent requirements, often stipulated by the manufacturer of products for such applications, as regards handling, processing and storage of the materials especially where safety considerations are paramount. The thermosetting resin matrix composition (in short "matrix") comprises at least one resin polymer component and at least one curative. The curative enables the resin component to form an interpolymer network upon curing. Curing is achieved by imparting energy to the resin matrix composition, preferably the energy is in the form of heat.

Prepregs may be produced by a range of methods which typically involve impregnation of a moving fibrous web with a liquid, molten or semi-solid uncured thermosetting resin matrix composition. The thermosetting resin matrix may be cast on a substrate before it is applied to the reinforcement material or alternatively, the thermosetting resin matrix composition may be applied directly to the fibrous reinforcement material (direct impregnation). Prepregs may also be manufactured by exposing the fibrous reinforcement to a solvated thermosetting resin matrix composition which is then followed by flashing off of the solvent.

The lay-up of prepreg inevitably results in sections of unused prepreg (off cuts). Also, the production process of the prepreg may result in unused sections or volume of resin matrix composition. In this application we will refer to the unused resin matrix composition (or resin matrix) and the unused prepreg as "by-product".

Due to safety considerations and stringent requirements relating to handling, processing and storage of resins matrices and prepregs, re-use of by-products has been problematic. Furthermore, re-use of waste resin products has not proved economically viable to date. Whilst recycle and re-use of dry carbon fibre waste is known on a commercial scale, the costs and technical difficulties of "recycling" resin especially from prepregs by pyrolysis (burning off of the resin matrix) and solvolysis (dissolution of the resin matrix from the fibrous reinforcement) has presented difficulties due to high costs and energy requirements to process the resin. In the case of prepregs, the removal of resin has also been difficult due to stringent performance and safety specifications.

US2015/0151454 describes a method and system for recycling uncured composite offcuts comprising reinforcing fibres and uncured polymer matrix material by mixing the uncured composite material in a mixing device to blend the fibres and matrix material into a generally homogeneous mixture and feeding the mixture from the mixing device to form a component or a semi-finished product. The offcuts are fed into the mixing device directly without pre-treatment of the offcuts.

Uncured or unused resin matrix composition and prepregs may be stored in a wide range of ambient conditions from sub-zero to high temperature and humidity depending on the prevailing climate in the storage location and may undergo changes in properties, particularly in Tg. Where such materials are processed into a pre-preg or composite product and waste resin matrix composition material is generated, re-use of such material may not be possible in applications where it is necessary to be able to guarantee the conditions under which the resin matrix composition has been stored prior to use. A need remains for uncured resin matrix compositions to be suitable for use in the forming prepregs and composite products irrespective of the prior storage conditions under which the properties of the resin matrix composition may have varied.

The invention aims to obviate or at least mitigate the above described problems and/or to provide improvements generally.

According to the invention there is provided a method, a composition, a product and a compound as defined in any one of the accompanying claims.

According to the invention there is provided a method of producing a moulding composition comprising providing a fibrous reinforcement material impregnated with a stabilised uncured resin matrix composition and combining the stabilised uncured resin matrix composition and impregnated fibrous reinforcement material with a further resin matrix composition.

In the context of the inventions as disclosed herein a stabilized resin is obtained by treating an uncured resin to impart energy to the resin matrix without advancing the cure of resin matrix composition to a value above a selected % of its total cure enthalpy. This selected % is above 60% but may also be selected to be above 40% or above 50% or above 70%. The Tg of the stabilised resin does not change significantly (a variation of less than 10% of the initial Tg) over an extended period (of 14 days or longer). The uncured resin may then be suitable for processing to form a prepreg or composite having the properties required for a particular application. Additional details on the stabilized resin are provided in the specific description of this application.

The invention provides in a first aspect a method of producing a moulding composition comprising providing a fibrous reinforcement material impregnated with a stabilised uncured resin matrix composition and combining the matrix composition and impregnated fibrous reinforcement material with a further resin matrix composition.

The invention also provides in a second aspect a moulding composition comprising:
i) a fibrous reinforcement material impregnated with a stabilised uncured resin matrix composition; and
ii) a further resin matrix composition.

The stabilised uncured resin matrix composition and the further resin matrix composition may comprise the same or different resin matrix.

The further resin matrix composition may have properties which allow for the moulding composition to have additional properties which are not imparted by the first stabilized resin matrix composition. The further matrix composition may provide fast cure properties, a desired colour, desired flow properties, desired performance properties following cure and/or a combination of the aforesaid properties.

Suitably the stabilised uncured resin matrix composition comprises a first composition and the further resin matrix composition comprises a second composition. The first and second composition may be the same or they may be different.

Suitably the fibrous reinforcement material impregnated with the treated uncured resin matrix composition comprises a previously formed prepreg. Advantageously, the waste or by-product prepreg may be re-used by subjecting the prepreg to a treatment to provide the resin matrix composition with a stable Tg. The prepreg may be stored prior to being treated to provide a stable Tg. Alternatively or in addition, the stabilised uncured resin matrix composition with fibrous reinforcement material may be stored prior to be combined with the further resin matrix composition.

The fibrous reinforcement material impregnated with the stable uncured resin matrix composition is preferably in the form of discrete elements. The discrete elements may be of any shape but preferably have an aspect ratio (Length/Width) of at least 2 for example 5 such that the elements may be oriented in a common direction during processing as desired. The fibrous reinforcement material impregnated with the stable uncured resin matrix composition, whether in the form of discrete elements or otherwise, suitably has a tack of not more than 0.8 at ambient temperature which desirably reduces agglomeration or sticking. This facilitates cutting and handling during downstream processing and may reduce process downtime by reducing the requirement for servicing or cleaning process apparatus for example when combining with the further resin matrix composition.

Preferably, the discrete elements have a tack of not more than 0.1 to 0.45 at ambient temperature as defined with reference to WO2013087653 A1 and DUBOIS ET AL: 'Experimental analysis of prepreg tack' LAMI)UBP/IFMA 5 Mar. 2009 and as summarized below.

Tack measurement is performed using the probe tack test as disclosed in the above Dubois et al. paper. A 1 kN Instron 5543 universal testing machine (Norwood, Mass., USA) is used. The upper grip of the machine is replaced by an aluminium cylindrical probe of 10 mm diameter mounted on the moving crosshead of the machine, via a 50 N capacity load cell. The probe can be heated with a flexible heater. A PT100 temperature sensor linked to a Proportional-Integral-Derivative (PID) temperature controller regulates the temperature. Test samples are applied on the lower support. The probe, which is surrounded by a heater, is set at a given temperature, and then the probe is brought into contact with the sample, and the maximum reading of the load cell was recorded for each test. The test procedure used for the tack measurement is as follows: 1. Test strips of prepreg or resin matrix material are cut to meet the probe. Samples were then put in a climatic chamber for a given time at controlled temperature and Relative Humidity; 2. Before each run, the contact surface of the probe and the support are cleaned with acetone; 3. Contact time, contact force and debonding rate are set for the mechanical cycle; 4. The temperature of the probe was set by regulator; 5. Once the temperature of the probe reached the set point and was equilibrated, the sample was removed from the climatic chamber and was positioned on the support. It should be noted that the side of the sample protected by a release paper, i.e. the tackiest side, was applied without pressure on the lower grip. The release paper was then removed; and 6. The value given by the load cell was reset and the test started. Time, force and crosshead displacement were then measured.

The Dubois et al method allows tack to be measured objectively and repeatably by using the equipment as described above and by measuring the maximum debonding force for a probe which is brought in contact with the sample structure at an initial pressure of 30N at a constant temperature of 30° C. and which is subsequently displaced at a rate of 5 mm/min. For these probe contact parameters, the tack F/Fref for the tack material is in the range of from 0.1 to 0.6 or from 0.1 to 0.45 at room temperature (21° C.) where Fref=28.19N and F is the maximum debonding force.

By having a low tack, suitably at ambient temperature, the discrete elements may be readily processed and are less susceptible to agglomeration. This facilitates cutting and handling at room temperature (21° C.) for example when using the treated unused or uncured resin matrix composition in the formation of a prepreg and may reduce process downtime by reducing the requirement for servicing or cleaning process apparatus for example when forming a prepreg.

Alternatively, the discrete elements may be cooled to a temperature below ambient to reduce their tack prior to and/or during cutting and processing to enhance their processability. Typically the temperature could be reduced to $-18°$ C.

In one embodiment the discrete elements are suitably arranged in two dimensions such that on combining with the further resin matrix composition, the resulting moulding product is in sheet form.

The discrete elements comprising the fibrous reinforcement material impregnated with a stabilised uncured resin matrix composition are suitably encapsulated by the further resin matrix composition which may advantageously retain undesirable fragments or dust of prepreg within the moulding composition.

Where the fibrous reinforcement material impregnated with the stable uncured resin matrix composition or prepreg is a by-product from an earlier process, it may comprise two or more plies comprising of the fibrous reinforcement impregnated with uncured resin matrix composition. By treating the prepreg to stabilise the Tg such that it has low or no appreciable tack, the plies may be separated as desired at room temperature (21° C.).

Suitably, the stabilised uncured resin matrix composition comprises discrete elements which have a torque peel (T Peel) of less than 10N/10 mm and desirably less than 5N/10 mm at 20° C. T Peel is preferably determined by a method as set out in the Examples below.

By employing a further resin matrix composition with the fibrous reinforcement material impregnated with stabilised resin matrix composition, for example a re-used substantially uncured prepreg, product characteristics such as handling, flow, FST and thermal and electrical conductivity may be tailored and controlled by appropriate selection of the additional resin matrix composition to enable re-use of prepregs from earlier processes. Re-used prepreg material which hitherto may have been discarded as waste may now be reused to form a moulding composition having identified characteristics due to the resin matrix composition having been stabilised and thereby meet specifications for downstream use in a range of applications.

The fibrous reinforcement material impregnated with a resin matrix composition to which a further resin matrix composition is added is suitably treated to provide a stabilised resin matrix composition having a Tg which does not vary by more than 10% over a period of time, as described in more detail below. The use of stabilised resin matrix composition in which its Tg does not vary significantly over time and has a low tack enables the fibrous reinforcement material impregnated with the stabilised resin matrix composition to be stored under ambient conditions, obviating the need for providing complex storage arrangements for example cooling, and facilitates downstream processing.

The further resin matrix composition may be combined with the fibrous reinforcement material impregnated with a stabilised resin matrix composition by coating a sheet of the further resin matrix composition on either side of a two dimensional array of discrete elements to form a sandwich and to encapsulate the fibrous reinforcement material impregnated with a stabilised resin matrix composition within the sheets of further resin matrix composition. This process may be carried out at elevated temperature depending on the composition of the resin matrix composition for example 30 to 100° C. for example 50 to 80° C. Suitably the process is carried out under elevated pressure, for example 2 to 10 bar, for example 3 to 6 bar.

Another method to add the further resin matrix composition is to spray a liquid or powder resin matrix composition onto the fibrous reinforcement material impregnated with a stabilised resin matrix composition The fibrous reinforcement material impregnated with a resin matrix composition to which a further resin matrix composition is combined may be in the form of a sheet moulding compound (SMC). This material is essentially a prepreg comprising fibrous reinforcement material layers which are preimpregnated with a resin matrix composition system and the further resin matrix composition is then coated or otherwise combined with this material.

The resin matrix composition system suitably comprises a resin matrix composition paste intermixed with a light weight filler to lower the density of the material. The addition of the filler also reduces the cost of the material. The SMC material is formed by applying fibrous reinforcement material layers onto a resin matrix composition layer which comprises the resin matrix composition system and filler to form a laminate. The laminate is pressed between impregnation rollers to drive the resin matrix composition system into the reinforcement layers to form the prepreg SMC material.

The SMC material can be obtained into a flat sheets or suitably remains conformable and windable to facilitate further processing. The SMC material can be readily processed by applying pressure and/or vacuum to harden (cure) the material whilst the material is at a suitable processing temperature.

The fibrous reinforcement material impregnated with a resin matrix composition to which a further resin matrix composition is combined may be in the form of a bulk moulding compound (BMC).

The stabilised resin matrix composition with fibrous material may be cut into discrete elements. Known cutting operations may be employed for example longitudinal shear cutting between fixed and rotary blades which is especially suitable where the material is in the form of a monopoly or narrow uni-directional tape. For wide uni-directional tape, longitudinal pressure cutting may be employed. Upon cutting, the discrete elements may be separated, and sorted based on size as desired to tailor the characteristics of the moulding composition.

For an SMC product, the cut, discrete elements are suitably distributed and combined with the further resin matrix composition, which may partially or entirely encapsulate the discrete elements. The moulding composition thus formed may then be wound and packaged ready for storage or downstream use.

For a BMC product, the cut discrete elements comprising the stabilised resin matrix composition with fibrous material may be combined with the further resin matrix composition for example in the form of a liquid, flakes or powder, and then packaged in readiness for storage or subjected to further processing.

Suitably, the moulding composition may be placed in a mould and subjected to conditions to cure the further resin matrix composition. The further resin matrix composition may be a fast cure resin matrix composition and may be subjected to a high temperature for a relatively short period, for example 120 to 200° C., for example 180° C., for 1 to 10 minutes, for example 2 minutes. The further resin matrix composition suitably cures at least partly to provide a moulded part and the temperature may be raised further to fully cure the stabilised resin matrix composition if that has not been cured during the first curing step.

The further resin matrix composition can be a thermoset or a thermoplastic resin matrix composition.

Typically fibrous reinforcement material impregnated with a resin matrix composition is produced by depositing the resin matrix composition on a moving web of the fibres which may be woven or unwoven, may be of any fibre typically glass fibre, carbon fibre or aramid fibre and in unwoven material the fibres may be unidirectional, multi-directional or randomly oriented within the web.

The resin matrix composition which is impregnated into the fibrous reinforcement material and the further resin matrix composition may be deposited in a variety of ways. For example the fibrous material may be passed through a bath of the resin matrix composition. However in this process it is difficult to control the amount of resin matrix composition that is deposited on the fibrous material. Alternatively the resin matrix composition may be provided on a moving carrier such as paper or a plastic film which is brought into contact with a pressed into the fibrous web. In all such systems the fibrous web provided with the resin matrix composition is then passed through a roller system whereby the resin matrix composition is pressed into the interstices between the fibres in order to produce a uniform distribution of the resin matrix composition within the fibrous web. In each instance a backing sheet is usually provided on the free surface of the resin matrix composition so that the resin matrix composition does not contact and contaminate the rollers. Typically four or five roller systems are required to achieve a good distribution of the resin matrix composition within the fibrous web. Even so there are times when the distribution may not be adequate. Usually the resin matrix composition is heated at this time to reduce its viscosity to aid impregnation and the heating for the time required can cause undesirable precure or advancement of the resin matrix composition.

In a typical prepreg process a resin matrix composition is coated onto a silicone coated release paper or other process media in a coating machine, typically a reverse roll hot-melt coating machine known to those skilled in the art of composite material production. The resin matrix composition film or films are then used in a prepreg machine to transfer the resin matrix composition to the fibrous reinforcement causing it to contact and wet the filaments within the fibrous reinforcement and so impregnate the composite material into a preimpregnated product form termed a prepreg.

These films or film are then used in a typical prepreg machine where heat and pressure applied through a combination of heat plates and multiple sets of heated compaction rollers is used in order to reduce the viscosity of the resin matrix composition such that it flows into the fibrous reinforcement impregnating the fibrous reinforcement to the required level. The product is then cooled down on a chill plate back to ambient conditions, process papers or other media are then in some part removed and replaced with new coverings and further processing is completed as necessary for width and winding for end use presentation. In this typical prepreg process the resin matrix composition is advanced or partially cured through the exposure to heat.

The advancement or precure of the resin matrix composition can be shown by differential scanning calorimeter (DSC) testing.

DETAILED DESCRIPTION

Resin Matrix Compositions

The present invention may be employed with a wide-range of curable resin matrix compositions. One preferred family of thermosetting resin matrix compositions may contain curable thermosetting epoxy resin matrix compositions. The resin matrix composition may comprise other components for example thermoplastics or rubbers in the epoxy resin matrix composition. The epoxy resin component of the composition may be selected from any of the commercially available diglycidylethers of Bisphenol-A either alone or in combination, typical materials in this class include GY-6010 (Huntsman Advanced Materials, Duxford, UK), Epon 828 (Resolution Performance Products, Pernis, Netherlands), and DER 331 (Dow Chemical, Midland, Mich.).

The Bisphenol-A epoxy resin component preferably constitutes from 30 to 50% w/w of the total resin matrix composition matrix and the remainder may be a thermosetting resin matrix composition material and/or a thermoplastic material.

The viscosity of the resin matrix composition and the conditions employed for impregnation of the fibrous material by the resin matrix composition are selected to enable the desired degree of impregnation. It is preferred that during impregnation the resin matrix composition has a viscosity of from 0.1 Pa·s to 100 Pa·s, preferably from 6 to 100 Pa·s, more preferably from 18 to 80 Pa·s and even more preferably from 20 to 50 Pa·s. It is preferred that the resin matrix composition content is such that after curing the structure contains from 30 to 40 wt %, preferably 31 to 37 wt % more preferably 32 to 35 wt % of the resin matrix composition. The relative amount of resin matrix composition and fibrous reinforcement, the impregnation line speed the frequency of the applied ultrasound, the gap in the sonotrode through which the fibre and applied resin matrix composition passes, the viscosity of the resin matrix composition and the density of the fibrous reinforcement should be correlated to achieve the desired degree of impregnation of the fibrous material and if desired to leave spaces between the individual filaments which are unoccupied by the resin matrix composition.

Preferred epoxy resin components of the thermosetting matrix composition have an Epoxy Equivalent Weight (EEW) in the range from 150 to 1500 preferably a high reactivity such as an EEW in the range of from 200 to 500 and the resin matrix composition comprises the resin component and an accelerator or curing agent. Suitable epoxy resin components may comprise blends of two or more epoxy resin components selected from monofunctional, difunctional, trifunctional and/or tetrafunctional epoxy resin components.

Suitable difunctional epoxy resin components may, by way of example, include those based on: diglycidyl ether of bisphenol F, diglycidyl ether of bisphenol A (optionally brominated), phenol and cresol epoxy novolacs, glycidyl ethers of phenol-aldelyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be selected from diglycidyl ether of bisphenol F, diglycidyl ether of bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N, N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), and Araldite ECN 1299 (from Huntsman Advanced Materials).

The epoxy resin matrix compositions used preferably also comprises one or more urea based curing agents and it is preferred to use from 0.5 to 10 wt % based on the weight of the epoxy resin matrix composition of a curing agent, more preferably 1 to 8 wt %, more preferably 2 to 8 wt %. Preferred urea based materials are the range of materials available under the commercial name Urone®. In addition to a curing agent, a suitable accelerator such as a latent amine-based curing agent, such as dicyanopolyamide (DICY).

Another suitable product comprising resin matrix composition which may be employed in the present invention is the product available from Hexcel Composites Ltd as HexMC® or HexForm® which also comprises fibres. Examples of preferred resin matrix compositions for use in this invention include those thermosetting epoxy resins employed in Hex MC® M21, HexMC® M77, HexMC® M78, HexMC® M81 and HexMC® M92 as supplied by Hexcel Corporation.

In a preferred embodiment the fibrous reinforcement impregnated with a stabilised resin matrix composition or prepreg is selected from multifunctional epoxy thermosetting resin matrix compositions such as M21, M77, M78, M81, M92 and 8552 (all as supplied by Hexcel Corporation). The resin matrix composition is suitably a fast cure resin matrix composition or a resin matrix composition suitable for use in aerospace applications. The further resin matrix composition is preferably selected from M77 and M78 as supplied by Hexcel Corporation Other suitable resin matrix compositions for use in the present invention include polyester resin matrix compositions and bismaleimide resin matrix compositions.

The fibrous reinforcement material impregnated with an uncured resin matrix composition may comprise a recycled waste uncured prepreg which has previously been subjected to processing and has been discarded as an offcut or waste product in that prior process.

Fibrous Reinforcement Material

The fibrous material may be in the form of multifilament tows which may comprise cracked (i.e. stretch-broken), selectively discontinuous or continuous filaments. The filaments may be made from a wide variety of materials, such as carbon, basaltic fibre, graphite, glass, metalized polymers, aramid and mixtures thereof. Glass and carbon fibres tows are preferred carbon fibre tows, being preferred for aerospace components and wind turbine shells of length above 40 metres such as from 50 to 60 metres. The structural fibres are individual tows made up of a multiplicity of unidirectional individual fibres. Typically the fibres will have a circular or almost circular cross-section with a diameter for carbon in the range of from 3 to 20 µm, preferably from 5 to 12 µm. For other fibres, including glass, the diameter may be in the range of from 3 to 600 µm, preferably from 10 to 100 µm. Different tows may be used in different layers of the material that are moulded according to this invention and different composites may be used together according to the properties required of the final cured article.

Exemplary fibres include glass, carbon, graphite, boron, ceramic and aramid. Preferred fibres are carbon and glass fibres. Hybrid or mixed fibre systems may also be envisaged. The use of cracked (i.e. stretch-broken) or selectively discontinuous fibres may be advantageous to facilitate lay-up of the product according to the invention and improve its capability of being shaped. Although a unidirectional fibre alignment is preferable, other forms may also be used. Typical textile forms include simple textile fabrics, knit fabrics, twill fabrics and satin weaves. It is also possible to envisage using non-woven or non-crimped fiber layers.

The fibres may be randomly oriented or may be aligned, preferably longitudinally.

Resin Impregnation and Resin Content

The degree of impregnation of the resin matrix composition in the fibrous reinforcement material may be measured by the water pick up test. The water pick up test is conducted as follows: six strips of impregnated materials are cut of size 100 {+1−2) mm×100 {+1−2) mm. Any backing sheet material is removed. The samples are weighed to the nearest 0.001 g (W1). The strips are then located between PTFE backed aluminium plates so that 15 mm of the strip protrudes from the assembly of PTFE backed plates on one end and the fibre orientation of the prepreg extends along the protruding part of the strip. A clamp is placed on the opposite end of the strip and 5 mm of the protruding part is immersed in water having a temperature of 23° C., relative air humidity of 50%+/−35%, and at an ambient temperature of 23° C. After 5 minutes of immersion the sample is removed from the water and any exterior water is removed with blotting paper. The sample is then weighed again W2. The percentage of water uptake WPU (%) is then calculated by averaging the measured weights for the six samples as follows: WPU (%)=[(<W2>−<W1>)/<W1>]×100. The WPU (%) is indicative of the Degree of Resin Impregnation (DRI).

The fibrous reinforcement material impregnated with the resin matrix composition or a prepreg to which the further resin matrix composition is to be combined may have a resin matrix composition impregnation concentration ranging from 20 to 50% by weight, preferably from 30 to 40% by weight and more preferably from 32 to 38% by weight of the material or structure.

Resin matrix composition and fibre content of prepregs or other materials described herein may be determined in accordance with ISO 1 1667 (method A) for moulding materials or structures which contain fibrous material which does not comprise unidirectional carbon. Resin matrix composition and fibre content of materials which contain unidirectional carbon fibrous material are determined in accordance with DIN EN 2559 A (code A). Resin matrix composition and fibre content of moulding materials which contain carbon fibrous material are determined in accordance with DIN EN 2564 A.

The fibre and resin matrix composition volume percentages of a composite material can be determined from the weight % of fibre and weight % of matrix composition by dividing the weight % of each of the fibre and matrix by the respective density of the resin matrix and the fibre.

Typically, the values for the resin matrix composition content by weight for the uncured material to which a further resin matrix composition is to be added are in the ranges of from 15 to 70% by weight of the composite, from 18 to 68% by weight of the composite, from 20 to 65% by weight of the composite, from 25 to 60% by weight of the composite, from 25 to 55% by weight of the composite, from 25 to 50% by weight of the composite, from 25 to 45% by weight of the composite, from 25 to 40% by weight of the composite, from 25 to 35% by weight of the composite, from 25 to 30% by weight of the composite, from 30 to 55% by weight of the composite, from 35 to 50% by weight of the composite and/or combinations of the aforesaid ranges.

Typically, the values for the resin matrix composition content by volume for the material that can be produced according to this invention are in the ranges of from 15 to 70% by volume of the composite, from 18 to 68% by volume of the composite, from 20 to 65% by volume of the composite, from 25 to 60% by volume of the composite, from 25 to 55% by volume of the composite, from 25 to 50% by volume of the composite, from 25 to 45% by volume of the composite, from 25 to 40% by volume of the composite, from 25 to 35% by volume of the composite, from 25 to 30% by volume of the composite, from 30 to 55% by volume of the composite, from 35 to 50% by volume of the composite and/or combinations of the aforesaid ranges.

In a preferred embodiment which is particularly suitable in aerospace applications, the stabilised prepreg suitably comprises resin matrix composition at a level of 30 to 38% by volume of the prepreg. On combining with the further resin matrix composition the level of the resin matrix composition in the prepreg and the further resin matrix composition taken together, that is the total combined level of the two resin matrix compositions in the moulding composition suitably comprises 40 to 50% by volume of the total moulding compound.

Stabilized Resin Matrix

Suitably the stabilised uncured resin matrix composition is produced by imparting energy to an uncured resin matrix composition. We have found that by treating a resin matrix composition by imparting energy to the resin matrix without advancing the cure of resin matrix composition to a value above 60% of its total cure enthalpy, preferably above 50% of its total cure enthalpy and more preferably above 40% of its total cure enthalpy, or more preferably above 30% of its total cure enthalpy or more preferably above 20% or above 10% of its total cure enthalpy, the Tg of the resin is stabilised such that it does not change significantly over an extended period. The uncured resin may then be suitable for processing to form a prepreg or composite having the properties required for a particular application.

The glass transition temperature or Tg is determined in accordance with ASTM D3418 using Digital Scanning calorimetry (DSC).

The unused resin matrix and/or unused prepreg may have a residual cure of greater than 5% of their total cure enthalpy, or greater than 10% of their total cure enthalpy, or greater than 15% of their total cure enthalpy, or greater than 20% of their total cure enthalpy, or greater than 30% of their total cure enthalpy, or greater than 40%, or greater than 45%, 50%, 60%, 70%, 80% or 90% of their total cure enthalpy. In this context, "unused" or "uncured" as used interchangeably in this application is thus defined by the residual cure available in the unused resin matrix composition or unused prepreg.

Digital Scanning calorimetry is utilized to determine % cure and reaction enthalpy. The total heat or reaction enthalpy detected during the DSC measurement is identified as the heat released by the curing reaction when the resin matrix composition is heated from a starting temperature of typically 10° C. (or room temperature of 21° C.) to a temperature at which cure is anticipated to be completed. For fast cure epoxy resins the temperature at which cure is anticipated to be fully completed is typically 100 to 225° C., preferably from 100 to 160° C. and the ramp rate for the temperature is typically set at 10° C./s or faster rate.

Once the total heat enthalpy has been established, the residual cure of any subsequent test sample of the resin which has been subjected to a particular cure can then be analysed by exposing the test sample to the same heat up rate and the remaining reaction enthalpy is determined using DSC. The degree of cure of the test sample is then given by the following formula: cure %=($\Delta$Hi–$\Delta$He)/$\Delta$Hi×100 where $\Delta$Hi is the heat generated by the uncured resin heated from the starting temperature up to the anticipated fully cured temperature (in the present invention typically 150° C.) and $\Delta$He the heat generated by the test sample heated up after initial cure to it being fully cured at 150° C. (so $\Delta$He represents the residual enthalpy which is released following complete curing of the sample following on from the initial cure schedule).

A stabilised unused or uncured resin matrix composition is conceived by providing a resin matrix composition having an initial Tg and subjecting the resin matrix composition to:
I. a first regime comprising imparting energy to the resin matrix composition to raise the Tg by at least 5° C. to provide a raised Tg without substantially curing the resin; and
II. a second regime comprising storing the resin matrix composition to provide a stabilised resin matrix composition wherein the Tg of the stabilised uncured resin is such that it does not increase by more than 10° C. from the raised Tg when stored for at least 24 hours.

In Step I. "without substantially curing" means that the residual cure of the resin matrix is reduced by a maximum of 20%, preferably a maximum of 10% and more preferably a maximum of 5%. In Step I the imparting of energy without substantially curing of the matrix composition results in a reduction of residual cure enthalpy in the range of from 1 to 20%, preferably from 2 to 15% and more preferably from 5% to 10% and/or combinations of the aforesaid ranges.

The curing reaction of the resin matrix composition progresses more rapidly during the step of imparting of energy but this is arrested or reduced to a very low rate in Step II when the resin matrix composition is stored.

The duration of step I is selected so minimize the impact on the residual cure enthalpy of the resin matrix composition. The duration is in the range of from 72 hours to 30 mins, preferably from 48 hours to 1 hour, more preferably from 24 hours to 4 hours, more preferably from 18 hours to 6 hours and/or combinations of the aforesaid ranges.

Step I of the process of the invention is sometimes referred to as "staging".

To determine whether curing commences and so to determine the conditions to be applied in treating the resin, methods known in the art may be employed, for example FTIR. In this respect we refer to "Applications of FTIR on Epoxy Resins—Identification, Monitoring the Curing Process, Phase Separation and Water Uptake", M González González, J C Cabanelas, J Baselga, as published in "Infrared Spectroscopy—Materials Science, Engineering and Technology", Edited by Prof. Theophanides Theophile, 2012

In a preferred embodiment, energy is imparted to the resin matrix composition by heating. This may occur in a number of ways: by heat transfer, radiation heating, ultrasound, microwave radiation, or infrared light.

Suitably, upon imparting energy to the resin matrix, the raised Tg of the resin matrix composition is at least 5° C., preferably at least 20° C., desirably at least 30° C. and especially greater than 50° C. The raised $T_g$ is preferably not increased beyond a value greater than preferably at least 40° C., desirably at least 60° C. and especially greater than 80° C. in comparison to its original $T_g$ before the start of the energy imparting step.

The resin suitably has a Tg above the ambient temperature under which it is likely to be used or stored thereby reducing the likelihood of the uncured resin being tacky and being susceptible to agglomeration which may present processing difficulties. Most fundamentally, given that Tg is linked to polymer backbone mobility, a Tg higher than ambient decreases the likelihood that the resin matrix will exhibit enough mobility to undergo continuing cross-linking reactions. The resin having a stabilised Tg may advantageously be handled and cut without problems occurring due to its tackiness or its flow (such as gumming and adherence)

Energy may be imparted to the uncured resin in the first regime by any suitable means, for example heating, pressure and microwave, holding the resin matrix composition at room temperature. Preferably, energy is imparted to the uncured resin matrix composition by heating to an elevated temperature for a first period of time. The resin may be subjected to pressure to impart energy to the resin. Suitably, the resin matrix composition is heated to an elevated temperature from 30° C. up to a temperature below the temperature at which the resin commences curing, preferably from 30 to 70° C. Suitably, energy is imparted to the resin matrix composition in the first regime for a period of 1 to 100 hours, preferably the first regime has a duration in the range of from duration is in the range of from 72 hours to 30 mins, preferably from 48 hours to 1 hour, more preferably from 24 hours to 4 hours, more preferably from 18 hours to 6 hours and/or combinations of the aforesaid ranges.

Once energy has been imparted to the resin matrix composition in the first regime, the resin matrix will have a raised Tg and is then suitably subjected to a second regime under which the raised Tg may increase. The uncured resin is subjected to that regime until the Tg remains stable in that it does not increase by more than 10%, preferably more than 8%, or 6% or 5% or 2% or 1% from the raised Tg when stored for at least 1 day or 2 days or 4 days or 5 days or 7 days or 14 days and/or combinations of the aforesaid percentages and durations.

The moulding composition according to the invention is suitable for storage over an extended period at ambient temperature without there being significant clustering or agglomeration of the resin matrix composition particularly when in the form of discrete elements irrespective of whether the storage temperature is regulated. Advantageously, this allows the moulding composition resin matrix compositions to be stored in a range of ambient conditions without the need to provide refrigeration or cooling areas to ensure the stored composition remains usable in downstream processes.

Suitably, the raised Tg of the resin matrix composition remains stable in that it does not increase by more than 10% from the raised Tg, when stored for at least 1 day and preferably for a period of at least 1 day to 90 days at ambient temperature.

Different resin matrix compositions may require different conditions to impart sufficient energy to the resin to provide a stable Tg whilst not commencing curing. Where the resin matrix composition has been previously used in the formation of a prepreg or composite, the conditions under which the resin matrix composition has been stored or processed may also influence the particular stabilising treatment regime required in order to provide an uncured resin matrix composition having a stabilised Tg. Suitably the conditions of the first regime and the second regime in the method for providing a stabilised uncured resin matrix composition are determined by subjecting an uncured resin matrix composition of a particular type of from a particular source to a method of determining the treatment regime for stabilising the glass transition temperature (Tg) of that uncured resin matrix composition which method comprises:

i) providing an uncured or unused resin matrix composition having an initial Tg and selecting a first regime comprising an elevated temperature and residence time to impart energy to the uncured or unused resin matrix composition whereby the residual cure of the resin matrix is reduced by a maximum of 20%, preferably a maximum of 10% and more preferably a maximum of 5%;

ii) imparting the selected energy over the selected residence time so as to increase the Tg of the resin matrix composition;

iii) selecting a second regime comprising storing the resin matrix composition at a selected second temperature and second residence time wherein the second regime is different to the first regime, the selected temperature and residence time being selected so that the $T_g$ does not increase by more than 10%, preferably more than 8%, or 6% or 5% or 2% or 1% ° C. from the raised Tg when stored for at least 1 day or 2 days or 4 days or 5 days and/or combinations of the aforesaid percentages and durations;

iv) subjecting the resin matrix composition to the second regime;

v) measuring the raised Tg of the resin matrix composition prior to or at commencement of the second regime and measuring the Tg of the resin matrix composition periodically until over a selected period of time ranging from 12 hours to 144 hours or periods thereof either:

a. the periodically measured Tg does not increase by more than 1%, or 2%, or 4%, or 5% or 10% from the raised Tg thereby determining the conditions of the first regime and the second regime; or b. where the periodically measured Tg increases by more than 1%, or 2%, or 4%, or 5% or 10% from the raised Tg, modifying the first regime and/or second regime and repeating steps ii), iv) and v) until the periodically measured Tg does not increase by more than 1%, or 2%, or 4%, or 5% or 10% from the raised Tg.

The temperature and duration to which the resin matrix composition is subjected in the first regime may be selected having regard to the temperature at which the resin matrix composition commences curing. The particular resin matrix composition which is to be treated may be heated and analysed using known methods of determining Tg known in the art to determine this temperature. Suitably, a temperature below that level will be appropriate to provide a means of imparting energy to the resin matrix composition without curing commencing. Desirably, the resin matrix composition is heated to an elevated temperature from 30° C. up to a temperature below the temperature at which the resin matrix composition commences curing, preferably from 30 to 70° C. Suitably, energy is imparted to the uncured resin matrix composition in the first regime for a period of 1 to 144 hours, preferably in the range of from duration is in the range of from 72 hours to 30 mins, preferably from 48 hours to 1 hour, more preferably from 24 hours to 4 hours, more preferably from 18 hours to 6 hours and/or combinations of the aforesaid ranges.

Once energy has been imparted to the resin matrix composition in the first regime, the resin matrix composition will have a raised Tg. This Tg, referred to as the "raised Tg" of the resin matrix composition is suitably measured using methods known in the art, preferably differential scanning calorimetry (DSC). The resin matrix composition is then suitably subjected to a second regime under which the Tg of the uncured resin matrix composition is measured periodically to determine any change, particularly an increase in Tg. Where the Tg of the resin matrix composition does not increase by more than 10% from the initial $T_g$ following the energy imparting step and preferably by not more than 5% from the raised Tg following the energy imparting step over a period of 1 day, the resin matrix composition may be considered as having a stable Tg. If the Tg continues to vary outside these bounds, the resin matrix composition is not considered as having a stable Tg and the method repeated using the same or a different sample of the resin matrix composition.

In this case, the conditions of the first regime should be altered by increasing the temperature and/or period under which energy is imparted to the resin matrix composition and the same sample or a different sample of the uncured resin matrix composition subjected to the first and second regime with the Tg of the resin matrix composition being periodically determined in the second regime.

With knowledge of the present method of determining a treatment regime for stabilising the glass transition temperature (Tg) of a curable resin matrix composition, the skilled person will be able to modify the conditions of the first regime to determine the conditions under which the resin matrix composition may be treated to provide a stabilised Tg. The treatment regime, as determined by this method using samples of a particular resin matrix composition from a particular source may then be employed to stabilise a resin matrix composition of that type and from the same source in a method according to the first aspect of the invention.

The invention is illustrated by the following non-limiting examples and with reference to the accompanying drawings in which.

EXAMPLE 1

Several batches of pre-preg products comprising uncured resin matrix composition and carbon fibres were subjected to T Peel testing. The pre-preg product was as follows:

3 batches of M21E/34%/UD 194/IMA-12K:
Batch 1: N23C14 02A
Batch 2: N14302 12A
Batch 3: N14205 05A
1 batch of M21E/34%/UD 268/IMA-12K:
Batch 1*: N22A1801A
Stabilizing $T_g$ Five samples from each batch were subjected to a first regime by heating in an oven at 50° C. under a dry atmosphere during following periods: 24 h, 72 h, 144 h, 152 h and 200 h. For each batch, a sample of fresh material was kept without being subjected to the first regime, And referred to as T0 below. After the first regime, the samples were held in a freezer at −18° C. (0° F.) Furthermore, each specimen was analyzed by DSC[1] test just after the first regime and prior to the second regime to determine Tg. The Tg results are shown in Table 1.

The DSC cycle used for analysis consisted in a ramp of 10° C./min from −60° C. (−76° F.) to 315° C. (600° F.) samples comprised 7 mg of resin matrix composition (approximately 20 mg of prepreg). The Tg value measured is the "midpoint" temperature. Unless otherwise stated, DSC measurements may be carried out using this method.

TABLE 1

| | Tg for each batch | | | | | |
|---|---|---|---|---|---|---|
| | T0 | 24 h @ 50° C. | 72 h @ 50° C. | 144 h @50° C. | 152 h@50° C. | 200 h@50° C. |
| BATCH 1 | −0.99° C. | 1.1° C. | 7.39° C. | 17.63° C. | 18.19° C. | 29.74° C. |
| BATCH 2 | −2° C. | 0.97° C. | 6.24° C. | 16.6° C. | 19.33° C. | 26.13° C. |
| BATCH 3 | −0.84° C. | 2.91° C. | 9.19° C. | 15.41° C. | 23.04° C. | 27.39° C. |
| BATCH 1* | −0.24° C. | 2.63° C. | 8.15° C. | 17.41° C. | 19.71° C. | 27.91° C. |

[1] Differential scanning calorimetry

Storage Simulation

The samples were subjected to a process to simulate storage of resin matrix composition chips in a bulk quantity in a storage bag under harsh conditions of storage. This simulation increased the chance that clustering or agglomeration of chips might occur A temperature of 60° C. to simulate bright sunlight and a pressure of 1 bar (14.5 psi) was applied, corresponding to the higher pressure that a chip could perceive at the bottom of a storage bag. The storage conditions were performed by using a "vacuum bag" method as set out below and with reference to FIG. 1.

Figure 1:
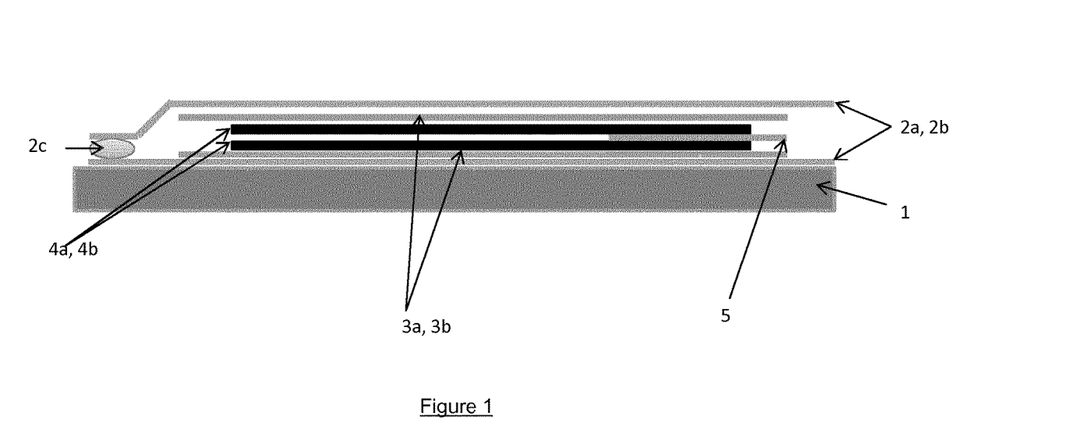
FIG. 1 presents a diagrammatic view of a lay-up of a resin matrix composition according to an embodiment of the invention using a vacuum bag.

Apparatus for the vacuum bag method is shown in FIG. 1 which shows a tool 1 upon which is mounted a vacuum bag 2 having a first side 2a and a second side 2b sealed with mastic 2c and a sandwich arrangement comprising two layers of Teflon coated glass, referred to as "breathers", 3a, 3b, layers of resin matrix composition product 4a and 4b and a Teflon coated glass primer 5 (length 50 mm) with which to commence the T Peel test.

Two layers of the sample resin matrix composition are mounted in the apparatus and the assembly was placed in an oven for 15 hours at 60° C. and a pressure of 1 bar was applied using a vacuum pump.

Samples Preparation and T Peel Test

Once the samples had been subjected to the Storage Simulation the samples were prepared for use in T Peel tests. The T Peel test allows the adhesion strength between two layers of a sample bonded to each other to be determined using a tensile machine. An average strength of debonding between layers is measured and a "Peel torque" is determined. The "Peel torque" is equal to the average strength normalized to a 10 mm width. For each batch and each treatment, 3 samples were tested according to T Peel test ISO11339. The samples were cut to the following dimensions:

Width: 30 mm
Length: 300 mm
Depth: 2 plies
Orientation: 0°

Figure 2:
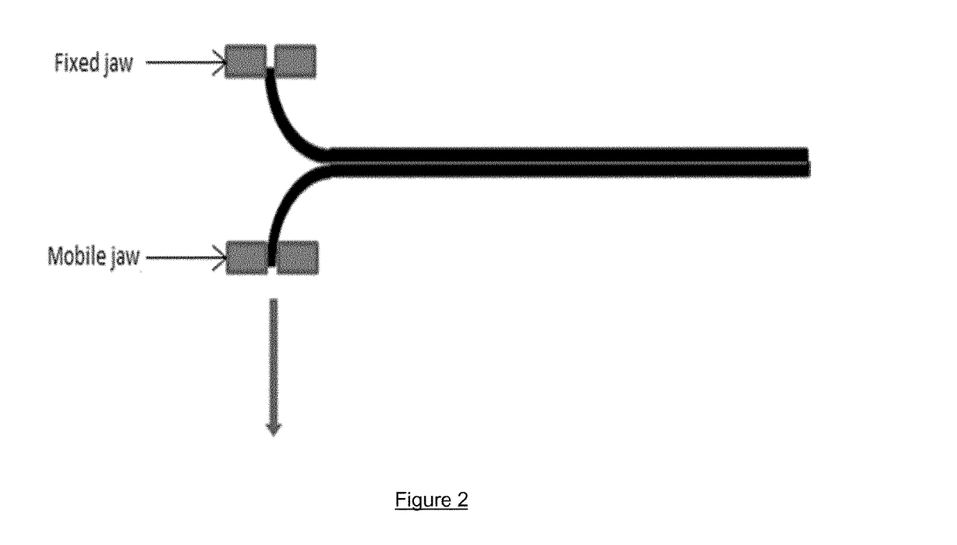
FIG. 2 presents a diagrammatic view of gripping layers of a sample according to another embodiment of the invention.

The two layers of the sample were gripped respectively in a fixed jaw and a mobile jaw as shown in FIG. 2. The two layers of the sample are then separated by moving the mobile jaw away from the fixed jaw in the direction shown. The force applied in the test to separate the layers and its variation is measured using software in accordance with ASTM D1876, from which an average value of debonding strength and Peel torque value are determined.

The results of the T Peel test are set out in Tables 2 to 5. For each batch three samples were tested under each regime and the results are the mean value of the three tests.

TABLE 2

| BATCH 1 | Average debonding strength [2](N) | Average Peel torque [3](N/10 mm) |
|---|---|---|
| T0 | 34.8 | 11.6 |
| 24 h @ 50° C. | 38.7 | 12.9 |
| 72 h @ 50° C. | 2.2 | 0.7 |
| 144 h @ 50° C. | 0.1 | 0.0 |
| 152 h @ 50° C. | 0.4 | 0.2 |
| 200 h @ 50° C. | 0.2 | 0.1 |

[2]Mean value calculated from 3 specimens results
[3]Mean value calculated from 3 specimens results

TABLE 3

| BATCH 2 | Average debonding strength [4](N) | Average Peel torque [5](N/10 mm) |
|---|---|---|
| T0 | 34 | 11.3 |
| 24 h @ 50° C. | 43.2 | 14.4 |
| 72 h @ 50° C. | 2.1 | 0.7 |
| 144 h @ 50° C. | 0.4 | 0.1 |
| 152 h @ 50° C. | 0.2 | 0.1 |
| 200 h @ 50° C. | 0 | 0 |

[4]Mean value calculated from 3 specimens results
[5]Mean value calculated from 3 specimens results

TABLE 4

| BATCH 3 | Average debonding strength [6](N) | Average Peel torque [7](N/10 mm) |
|---|---|---|
| T0 | 40.2 | 13.4 |
| 24 h @ 50° C. | 47.1 | 15.7 |
| 72 h @ 50° C. | 1.5 | 0.5 |
| 144 h @ 50° C. | 0.9 | 0.3 |
| 152 h @ 50° C. | 0.2 | 0.1 |
| 200 h @ 50° C. | 0.3 | 0.1 |

[6]Mean value calculated from 3 specimens results
[7]Mean value calculated from 3 specimens results

TABLE 5

| BATCH 1* | Average debonding strength [8](N) | Average Peel torque [9](N/10 mm) |
|---|---|---|
| T0 | 42.0 | 14.0 |
| 24 h @ 50° C. | 41.4 | 13.8 |
| 72 h @ 50° C. | 15.5 | 5.1 |
| 144 h @ 50° C. | 1.7 | 0.6 |
| 152 h @ 50° C. | 1.6 | 0.5 |
| 200 h @ 50° C. | 1.4 | 0.5 |

Figure 3:
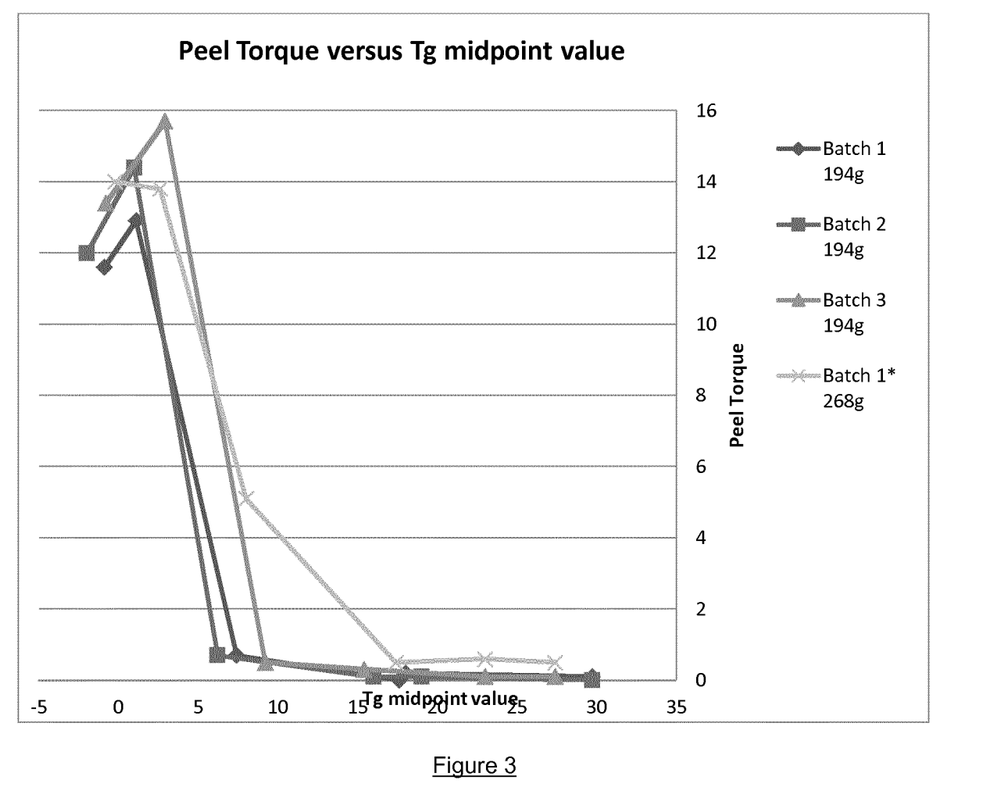
FIG. 3 presents a diagram showing the relationship between peel torque (in N/10 mm) in relation to Tg (in ° C.) according to an embodiment of the invention.

[8]Mean value calculated from 3 specimens results
[9]Mean value calculated from 3 specimens results A plot of the T Peel value versus Tg midpoint value for each batch was plotted and is shown in FIG. 3.

For batches 1, 2 and 3 adhesion decreases significantly around 5° C. of Tg and debonding occurs at approximately 15° C. A slight difference is noticed with results of batch 1* in that the adhesion decreases less abruptly than with the other batches and debonding occurs at around a Tg of 20° C. The batch 1* plies were thicker than the batches 1, 2 and 3 plies which may contribute to the tailing effect observed for batch1*.

For every batch debonding is reduced where the Tg is 5° C. and debonding occurs completely where the Tg value is above 20° C. for chips which have been treated according to the method of the invention and subjected to a simulation of harsh storage conditions.

In summary, resin matrix composition material staged so that it has a Tg over 20° C. is suitable for storage over an extended period at ambient temperature without there being significant clustering or agglomeration irrespective of whether the storage temperature is regulated.

EXAMPLE 2

Samples of M21E-34%-UD194 and M21E-34%-UD268 (fresh and Tg stabilized) were subjected to a clustering study to determine the Tg above which no significant levels of clustering were observed. The samples were heated at 60° C. for 15 hours under a pressure of 1 bar.

The DSC cycle used for analysis consisted in a ramp of 10° C./min from −60° C. (−76° F.) to 315° C. (600° F.).

We observed that where Tg of the sample was above 20° C., no significant clustering was observed.

EXAMPLE 3

Samples of M21E-34%-UD194 were subjected to a staging process and were held at 50° C. for 24, 192 hours and 40 days respectively to simulate storage conditions. A "fresh" sample was stored at 23° C. to simulate storage conditions. The Tg of the samples was tested using a DSC cycle consisting in a ramp of 10° C./min from −60° C. (−76° F.) to 315° C. (600° F.).

Figure 4:
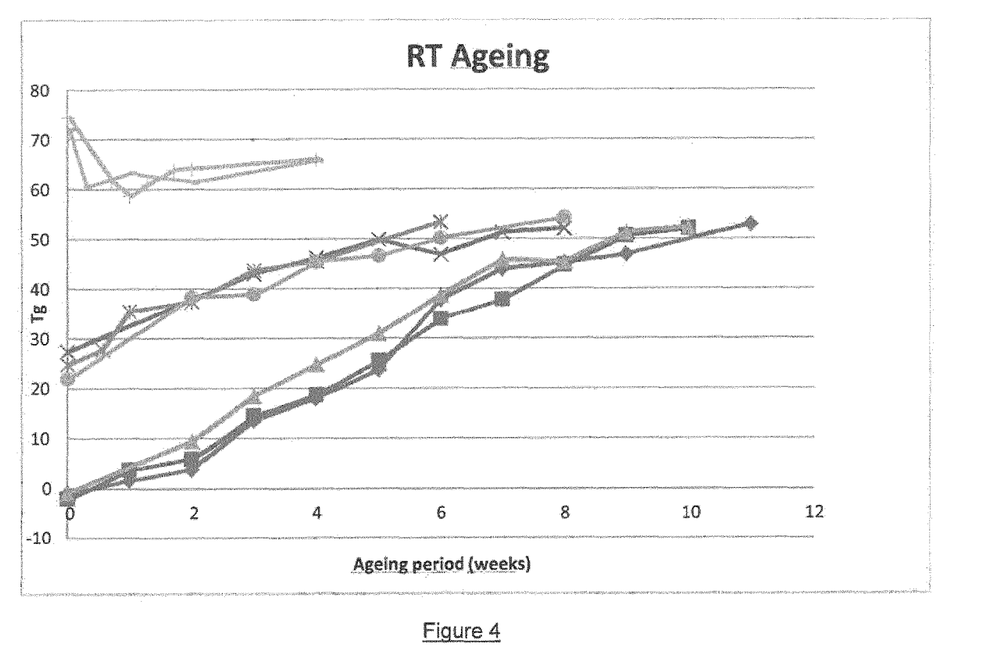
FIG. 4 presents a diagram showing the relationship between glas transition temperature $T_g$ (° C.) and aging time (weeks) according to an embodiment of the invention.

The Tg of the samples was plotted against storage time and is shown in FIG. 4.

The Tg of the uncured resin matrix composition stabilized at a Tg of around 50 to 60° C. By stabilization, we mean that once treated to obtain a raised or sub-ambient Tg, the Tg did not subsequently vary during storage by more than ±5° C.

EXAMPLE 4

Samples of M21E/34%/UD 194/IMA were subjected to a staging process and were heated to at 60° C. for 72 hours and then stored at room temperature for periods up to 154 days. The Tg of a sample was tested after 12 days, 39 days, 83 days, 122 days and 154 days. The Tg of the samples was tested using a DSC cycle consisting in a ramp of 10° C./min from −60° C. (−76° F.) to 315° C. (600° F.).

Figure 5:
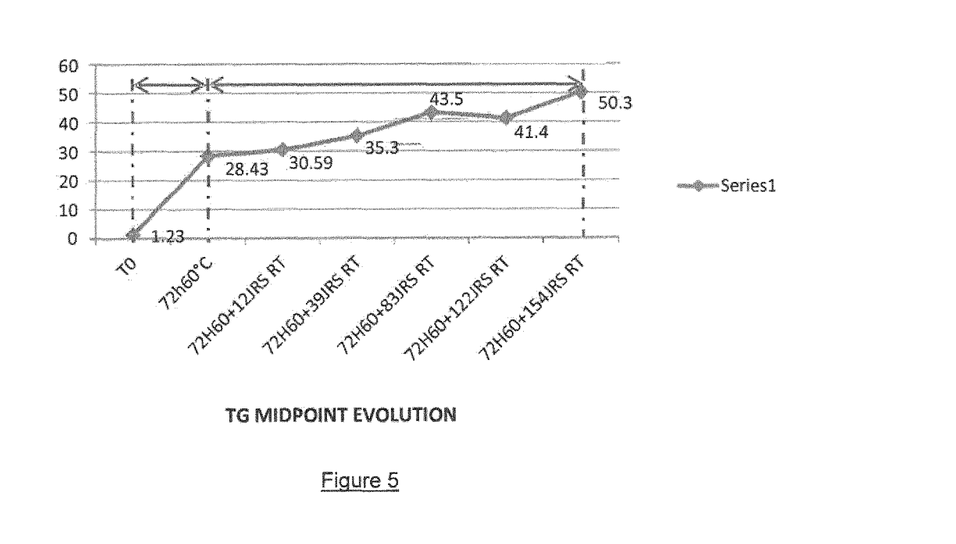
FIG. 5 presents a diagram showing another relationship between glas transition temperature $T_g$ (° C.) and aging time (hours) according to an embodiment of the invention.

The Tg of the samples was plotted against storage time and is shown in FIG. 5.

EXAMPLE 5

Figure 6:
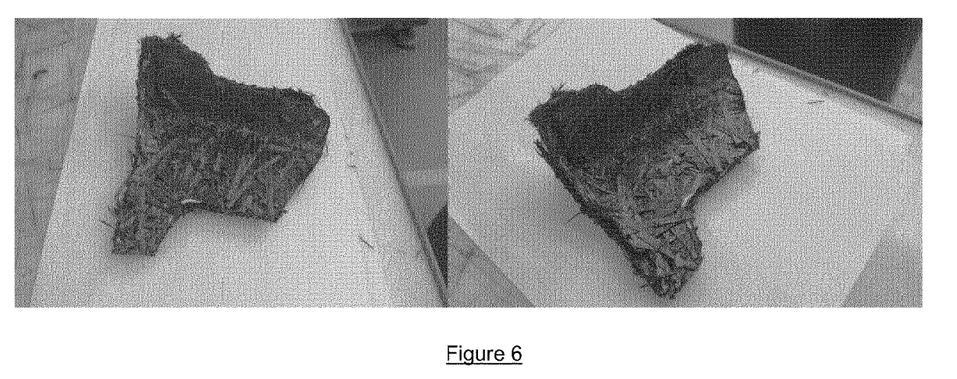
FIG. 6 shows a preform according to a further embodiment of the invention.

A moulding test was carried out using M21E/Selvedge Dublin sheet moulding compound which had been stored at room temperature (21° C.) for 154 days. 2 plies were manually cut from the SMC and pre-heated for 10 minutes at 90° C. and shaped. Photographs of the shaped preform are shown in FIG. 6.

Figure 7:
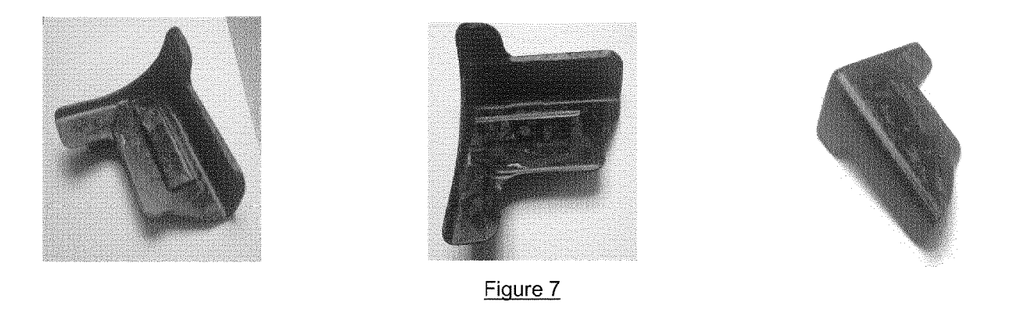
FIG. 7 shows a cured product according to another embodiment of the invention.

The preform was moulded at a temperature of 185° C. with a pressure of 90 tons being applied 30 seconds after the mould had been closed. The product was left to cure for 40 minutes to produce the product shown in the photographs of FIG. 7.

The preform weighed 71 g and after moulding and curing and deflashing, the formed part weighed 70.4 g.

These results demonstrate that a re-used prepreg may be suitable for compression moulding and may be so used even after storage at room temperature for more than 6 months.

EXAMPLE 6

Flow behaviour of a prepreg with and without a second resin matrix composition being added was tested by assessing the extent to which the material of the invention when applied to a central mould cavity was able to flow into an extension cavity during compression moulding.

Figure 8:
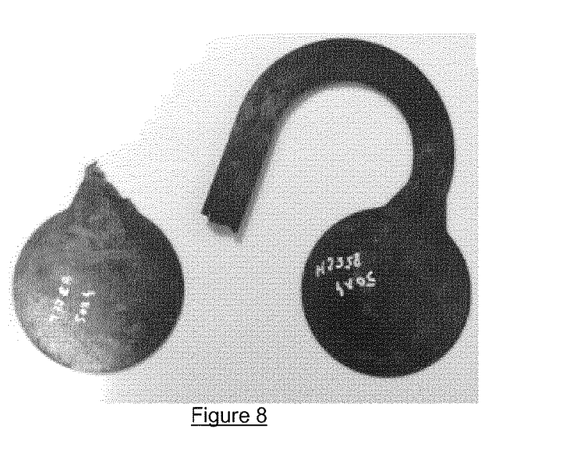
FIG. 8 shows another cured product according to a further embodiment of the invention.

FIG. 8 shows photographs of the flow behaviour of the product with additional resin matrix composition, shown on the left and without additional resin matrix composition, shown on the right.

The results show that by adding a further resin matrix composition to the fibrous reinforcement material impregnated with a first resin matrix composition, flow may be reduced thereby aiding downstream processing of the moulding composition.

EXAMPLE 7

Several HexMC M21E 194 plies were stabilised by aging in an oven at 27° C. during 3 periods of time:
30 Days
60 Days
90 Days After each period, sub ambient Tg was measured, then two fresh multifunctional epoxy resin matrix composition films (one per side) were added on each ply, and panels moulded under pressure. The mechanical properties of the products were evaluated and compared to fresh material which had not been subjected to the stabilisation/aging The panels tested were moulded using the following conditions in Table 6.

TABLE 6

| Material | Ply number 330 × 330 mm | Additional resin matrix composition file (2 per ply) | Mould temp | Staging | Pre-Heating | Pressure | Curing time | Post Cure |
|---|---|---|---|---|---|---|---|---|
| Aged HexMc M21E 194 34% Batch 50130M01 | 3 | Epoxy matrix 90 gsm Batch 50402N03 | 188° C. | — | 1 min | 100 bars | 30 mn | 2 h @ 180° C. |

The resin matrix composition did not flow to a level which required the mould to be cleaned Various mechanical properties of the panels were tested and the results are set out below in Table 7.

|  |  |  | No ageing | | 30 days at 27° C. | | 60 days at 27° C. | | 90 days at 27° C. | |
|---|---|---|---|---|---|---|---|---|---|---|
| Tensile | Strength (Mpa) | AITM 1.0007 | 312 | 6.3% | 312 | 14.4% | 355 | 9.9% | 270 | 27.9% |
|  | Modulus (Gpa) |  | 45 | 13.7% | 41.9 | 21.9% | 49.5 | 14% | 41.8 | 12.1% |
| Flexural | Strength (Mpa) | ASTM D2764 | 505 | 11.6% | 501 | 17% | 477 | 16% | 426 | 27% |
|  | Modulus (Gpa) |  | 38.3 | 11.8% | 35.9 | 26.8% | 39 | 26.1% | 33 | 22.8% |
| Compression | Strength (Mpa) | AITM 1.008 | 337 | 13.2% | 333 | 6% | 353 | 0.9% | 344 | 9% |
|  | Modulus (Gpa) |  | 42.5 | 23.3% | 46.2 | 18.5% | 45.9 | 20% | 44.5 | 16.8% |
| Ilss | Strength (Mpa) | ASTM D2344 | 66.4 | 18.2% | 78.2 | 18% | 80.2 | 12% | 76.5 | 11% |
| Flow | Length (Inches) | Internal | 9-9 | | 7-6.5 | | 8-7 | | 6-5 | |

|  |  |  | No ageing | 30 days at 27° C. | 60 days at 27° C. | 90 days at 27° C. |
|---|---|---|---|---|---|---|
| DMA (before/after Post Cure) | Tg(° C.) | AITM 1.0003 | 125/132° C. | 135/139° C. | 114/142° C. | 134/148° C. |
|  |  |  | 142/135° C. | 132/140° C. | 136/142° C. | 136/162° C. |
| DSC | Sub Ambient Tg(° C.) |  | −2.5° C. | 17.3° C. | 39.4° C. | 47.7° C. |

Figure 9:
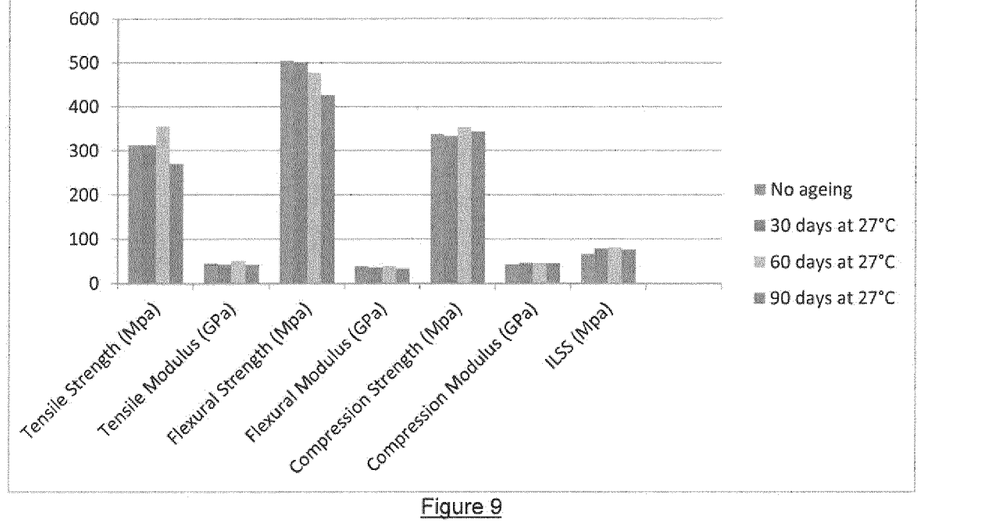
FIG. 9 presents a bar chart based on Table 4 of this application.

The properties of the 4 samples are shown in a bar chart in FIG. 9.

Figure 10:
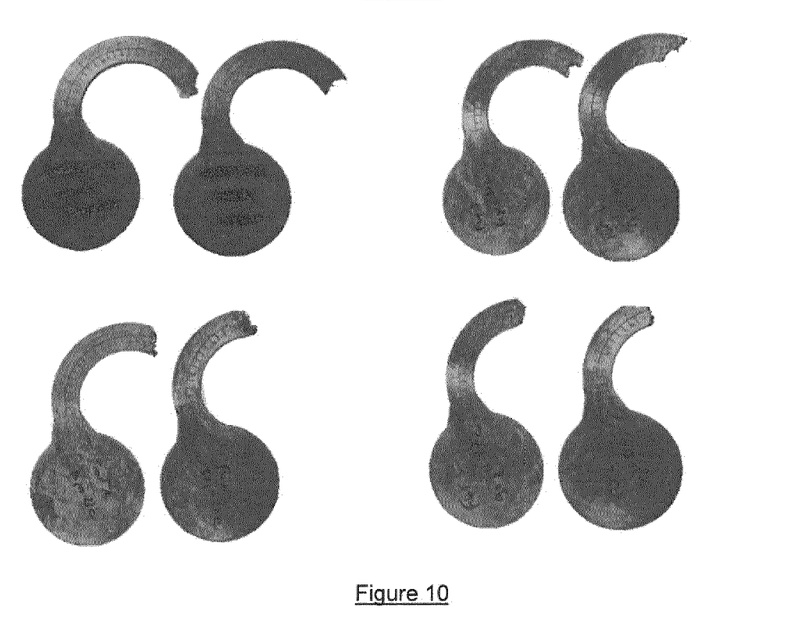
FIG. 10 presents cured products according to further embodiments of the invention illustrating the flow behaviour of the material of the invention.

The samples were subjected to a flow test and photographs of the samples are shown in FIG. 10: top left—non-staged, bottom left—30 days, top right—60 days and bottom right 90 days.

The results show that the aging conditions which allow the material to be stabilised and stored do not materially affect the mechanical properties of the product up to 60 days storage. Thereafter, flexural and tensile strength fall to a degree as compared to fresh material.

The flow capability was also reduced with storage at 90 days whereas it as stable up to 60 days. The material can be moulded after 90 days at 27° C.

The invention claimed is:

1. A method of producing a moulding composition comprising providing a fibrous reinforcement material impregnated with a stabilised uncured epoxy resin matrix composition and combining the stabilised uncured epoxy resin matrix composition and impregnated fibrous reinforcement material with a further resin matrix composition, wherein
the stabilized uncured resin matrix composition is conceived by providing a resin matrix composition having an initial Tg and subjecting the resin matrix composition to:
a first regime comprising imparting energy by heating to the resin matrix composition to raise the Tg by at least 5° C. to provide a raised Tg without substantially curing the resin; and
a second regime comprising storing the resin matrix composition to provide a stabilised resin matrix composition wherein the Tg of the stabilised uncured resin is such that it does not increase by more than 10° C. from the raised Tg when stored for at least 24 hours;
wherein the stabilized epoxy resin matrix composition and the further resin matrix composition comprise different compositions; and
wherein said uncured epoxy resin matrix composition comprises a previously formed prepreg, in the form of discrete elements.

2. The method according to claim 1 wherein the stabilised uncured resin matrix composition with fibrous reinforcement material is stored prior to combining with the further resin matrix composition.

3. A The method according to claim 2 wherein the discrete elements have a tack F/Fref of not more than 0.6 at room temperature where Fref=28.19N and F is the maximum debonding force.

4. A The method according to claim 3 wherein treatment of the uncured resin matrix composition comprises imparting energy by heating to the uncured resin matrix composition to raise the Tg of the resin matrix composition by at least 5° C. to provide a raised Tg without curing the resin matrix composition wherein the raised Tg of the stabilised uncured resin matrix composition is such that it does not increase by more than 10% when stored for 14 days.

5. The method according to claim 4 wherein the stabilised resin matrix composition is stored at ambient temperature prior to combining with the second resin matrix composition.

6. The method according to claim 5 wherein the stabilised resin matrix composition is stored for a period of at least 24 hours to 90 days at ambient temperature.

* * * * *